(12) United States Patent
Nagahama et al.

(10) Patent No.: US 10,202,809 B2
(45) Date of Patent: Feb. 12, 2019

(54) THREADED JOINT FOR STEEL PIPES

(71) Applicant: JFE Steel Corporation, Tokyo (JP)

(72) Inventors: Takuya Nagahama, Chita (JP); Osamu Sonobe, Niigata (JP); Masaki Yoshikawa, Chita (JP); Jun Takano, Chita (JP); Takamasa Kawai, Chita (JP)

(73) Assignee: JFE Steel Corporation (JP)

( * ) Notice: Subject to any disclaimer, the term of this patent is extended or adjusted under 35 U.S.C. 154(b) by 492 days.

(21) Appl. No.: 14/763,229

(22) PCT Filed: Jan. 28, 2013

(86) PCT No.: PCT/JP2013/000436
§ 371 (c)(1),
(2) Date: Jul. 24, 2015

(87) PCT Pub. No.: WO2014/115191
PCT Pub. Date: Jul. 31, 2014

(65) Prior Publication Data
US 2015/0368987 A1   Dec. 24, 2015

(51) Int. Cl.
*E21B 17/042*   (2006.01)
*F16L 15/00*   (2006.01)

(52) U.S. Cl.
CPC ............ *E21B 17/042* (2013.01); *F16L 15/00* (2013.01); *F16L 15/004* (2013.01); *F16L 2201/40* (2013.01)

(58) Field of Classification Search
CPC .................................................. E21B 17/042
(Continued)

(56) References Cited

U.S. PATENT DOCUMENTS 5,649,725 A * 7/1997 Nagasaku ............ E21B 17/042
285/334
6,045,165 A * 4/2000 Sugino .................. E21B 17/042
285/333
(Continued)

FOREIGN PATENT DOCUMENTS

EP      1 565 683       8/2005
JP      2005-351324 A   12/2005
(Continued)

OTHER PUBLICATIONS

Japanese Office Action dated Oct. 13, 2015, of corresponding Japanese Application No. 2014-558280, along with a Concise Statement of Relevance of Office Action in English.
(Continued)

*Primary Examiner* — Shane Bomar
*Assistant Examiner* — Steven A MacDonald
(74) *Attorney, Agent, or Firm* — DLA Piper LLP (US)

(57) ABSTRACT

A threaded joint in which the outer peripheral face of the pin nose has a single tapered shape, the seal face of the box has an outwardly convex curved shape, and a seal point $x_p$ defined by equation (1) is greater than or equal to 0.2 inches, $$x_p = \frac{\int_{x_1}^{x_2} pxdx}{F} \quad (1)$$

$$F = \int_{x_1}^{x_2} pdx$$

where p is a contact face pressure, x is a distance from an end of the pin in a pipe axis direction, and $x_1$ and $x_2$ are
(Continued)

respectively a lower limit and an upper limit of a domain of x corresponding to the seal portion.

4 Claims, 3 Drawing Sheets

(58) Field of Classification Search
USPC .......................................... 285/333, 334, 390
See application file for complete search history.

(56) References Cited

U.S. PATENT DOCUMENTS

| | | | |
|---|---|---|---|
| 8,840,151 B2* | 9/2014 | Hignett | F16L 15/00 285/333 |
| 8,894,101 B2* | 11/2014 | Pallini, Jr. | F16L 15/004 285/333 |
| 8,973,953 B2* | 3/2015 | Hignett | F16L 15/004 285/333 |
| 2002/0017788 A1* | 2/2002 | Krug | E21B 17/042 285/333 |
| 2005/0248153 A1 | 11/2005 | Sugino et al. | |
| 2008/0191479 A1* | 8/2008 | Suzuki | E21B 17/042 285/334 |
| 2012/0133129 A1* | 5/2012 | Hignett | F16L 15/00 285/339 |
| 2013/0181442 A1 | 7/2013 | Sonobe et al. | |
| 2014/0116560 A1 | 5/2014 | Kawai et al. | |

FOREIGN PATENT DOCUMENTS

| | | |
|---|---|---|
| JP | 4535064 B2 | 9/2010 |
| JP | 2012-180858 A | 9/2012 |
| WO | 2004/048834 | 6/2004 |
| WO | 2012/002409 A1 | 1/2012 |
| WO | 2012/056500 | 5/2012 |
| WO | 2012/118167 A1 | 9/2012 |

OTHER PUBLICATIONS

Japanese Office Action dated Feb. 3, 2015, of corresponding Japanese Application No. 2011-166280, along with a Concise Statement of Relevance of Office Action in English.
Supplementary European Search Report dated Mar. 9, 2016, of corresponding European Application No. 13872310.1.
European Communication dated Mar. 24, 2017, of corresponding European Application No. 13872310.1.

* cited by examiner $$X_p = \frac{\int_{X_1}^{X_2} px\,dx}{F}$$

$$F = \int_{X_1}^{X_2} p\,dx$$

p: CONTACT FACE PRESSURE
x: DISTANCE FROM END OF PIN IN PIPE AXIS DIRECTION
x1, x2: UPPER LIMIT AND LOWER LIMIT OF DOMAIN
    OF X CORRESPONDING TO SEAL PORTION (ENLARGED VIEW OF REGION A1)

(REGION B1, REGION B2)

(ENLARGED VIEW OF REGION B1)

(ENLARGED VIEW OF REGION B2)

THREADED JOINT FOR STEEL PIPES

TECHNICAL FIELD

This disclosure relates to a threaded joint for steel pipes and, in particular, to a threaded joint for steel pipes having high sealability and compression resistance suitable for use in connecting oil well pipes including tubing and casing generally used in prospecting for oil wells and gas wells and in production, that is, steel pipes such as oil country tubular goods (OCTG), riser pipes, and line pipes.

BACKGROUND

Threaded joints are widely used in connecting steel pipes such as oil well pipes, which are used in oil production facilities. To connect steel pipes for use in oil or gas prospecting and production, typical standard threaded joints based on the American Petroleum Institute (API) standard have been conventionally used. However, because crude oil wells and natural gas wells have recently increased in depth, and horizontal wells and directional wells have increased more than vertical wells, excavation and production environments are becoming severe. Furthermore, an increase in well development under hostile environments such as the sea and polar regions, diversifies performance requirements for threaded joints such as compression resistance, bending resistance, and external-pressure sealing performance (external pressure resistance). Therefore, this trend increases the use of special threaded joints having high performance which are called premium joints, and the demand to further improve the performance of such joints is increasing.

A premium joint is generally a coupling-type joint in which a pair of externally threaded male members (hereinafter referred to as pins) formed at ends of pipes and an internally threaded female member (hereinafter referred to as a box) are coupled. Each of the pins includes a tapered thread, a seal portion (specifically, a metal-to-metal seal portion), and a shoulder portion (specifically, a torque shoulder portion). The box connects the pins to each other. The tapered thread is important to strongly fix the pipe joint. The seal portion ensures sealability because the box and the pins come into metal-to-metal contact with each other at this portion. The shoulder portion serves as an abutment when the joint is tightened.

FIGS. 3(a)-3(c) are schematic explanatory diagrams of a premium joint for oil well pipes, which are longitudinal cross-sectional views of a threaded joint for cylindrical pipes. FIG. 3(a) is an overall view, FIG. 3(b) is an enlarged view of threaded portions (REGION B1) in FIG. 3(a), and FIG. 3(c) is an enlarged view of a region near a pin nose (REGION B2) in FIG. 3(a). The threaded joint includes pins 3 and a box 1 corresponding to the pins 3. Each of the pins 3 includes an externally threaded male portion 7 formed on the outer peripheral face thereof and a nose portion 8 (pin nose 8). The pin nose 8 is an unthreaded portion disposed at the end of the pin 3 to be adjacent to the externally threaded male portion 7. The pin nose 8 includes a seal portion 11 on the outer peripheral face thereof and a torque shoulder portion 12 on the end face thereof. The box 1, which faces the pin 3, has an internally threaded female portion 5, a seal portion 13, and a shoulder portion 14 on the inner face thereof, which are respectively capable of mating with or contacting the externally threaded male portion 7, the seal portion 11, and the torque shoulder portion 12 of the pin 3.

Threaded joints that are particularly resistant to an external pressure load have been proposed. For example, Japanese Patent No. 4535064 describes a radial-seal-type threaded joint in which a pin nose adjacent to the end of a pin comes into metal-to-metal contact with the inner face of a box in a radial direction, and the contact portion serves as a seal portion. The pin nose that is discontinuous with the seal portion (discontinuous in that the outer peripheral face of the pin nose is outside of an extension line of a seal face in the radial direction) is disposed between the seal portion and the shoulder portion, and the pin nose does not contact the box. In this threaded joint, since the seal portion is disposed to be separated from the end of the pin, high sealability can be obtained even if the thickness of the pin is relatively small.

However, the threaded joint described in Japanese Patent No. 4535064 has a problem in that the shape of the pin becomes complex and the productivity decreases, because it is necessary to form the pin nose to be discontinuous with the seal portion.

SUMMARY

We conducted a series of simulation calculations using finite element analysis (FEA) and experiments. We found that a threaded joint having a simple pin nose shape and having high sealability even in an external pressure environment can be obtained by limiting a seal point defined by a specific equation to be in a specific range.

We thus provide:

(1) A threaded joint for steel pipes comprising:

a pin including an externally threaded male portion, a pin nose extending from the externally threaded male portion toward an end of pipe, and a shoulder portion disposed at the end of the pin nose, and a box including an internally threaded female portion to be threadedly coupled with the externally threaded male portion, a seal face facing an outer peripheral face of the pin nose, and a shoulder portion that contacts the shoulder portion of the pin, wherein the pin and the box are threadedly coupled with each other such that the outer peripheral face of the pin nose and the seal face of the box come into metal-to-metal contact with each other and the contact portion serves as a seal portion, characterized in that the outer peripheral face of the pin nose has a single tapered shape, the seal face of the box has an outwardly convex curved shape, and a seal point $x_p$ defined by equation (1) is greater than or equal to 0.2 inches.

$$x_p = \frac{\int_{x_1}^{x_2} pxdx}{F} \quad (1)$$

$$F = \int_{x_1}^{x_2} pdx$$

wherein p is a contact face pressure, x is a distance from an end of the pin in a pipe axis direction, and $x_1$ and $x_2$ are respectively a lower limit and an upper limit of a domain of x corresponding to the seal portion.

A threaded joint for steel pipes having a simple pin nose shape and having high sealability even in an external pressure environment can thus be obtained.

REFERENCE SIGNS LIST

Figure 1:
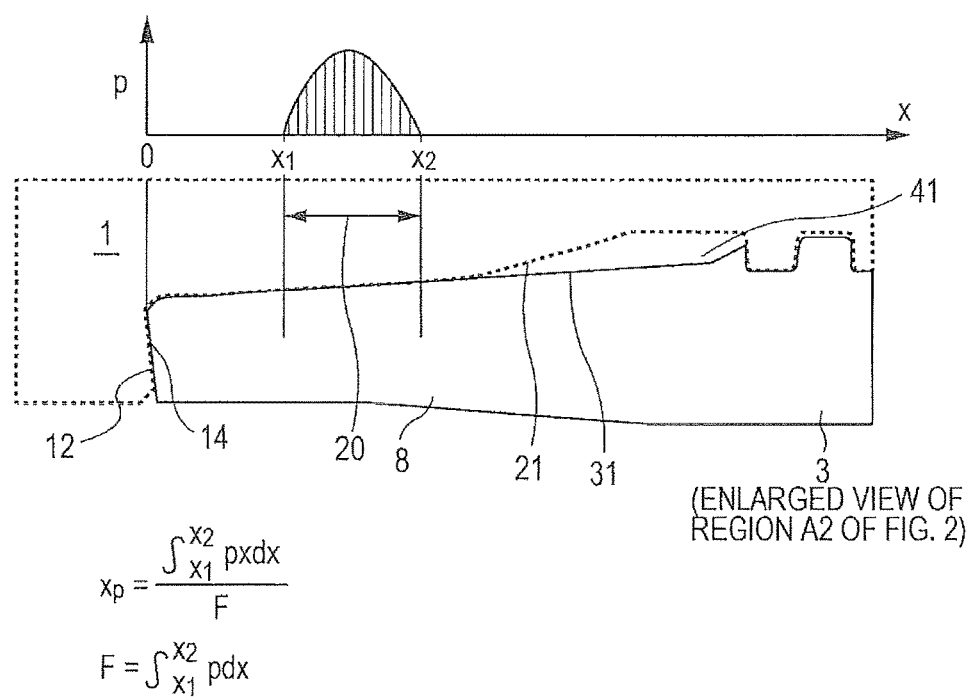
FIG. 1 is a graph and a schematic longitudinal sectional view illustrating an example of a threaded joint.

1: box
3: pin
5: internally threaded female portion
7: externally threaded male portion
8: nose (pin nose)
11, 13, 20: seal portion (specifically, metal-to-metal seal portion)
12, 14: shoulder portion (specifically, torque shoulder portion)
21: seal face
31: pin nose outer peripheral face (outer peripheral face of pin nose)
41: pin nose base gap

DETAILED DESCRIPTION

Figure 2A:
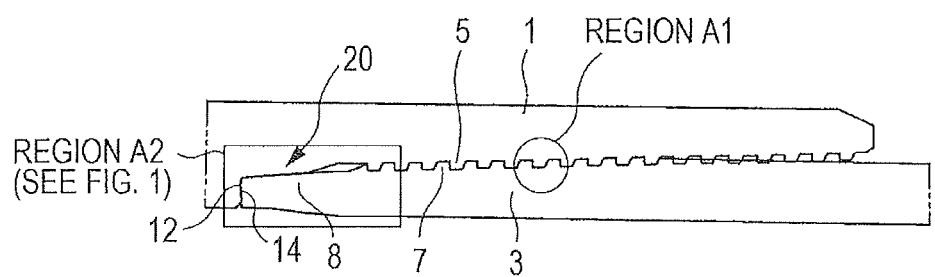
FIGS. 2(a) and 2(b) include schematic longitudinal sectional views illustrating an example of a threaded joint.
Figure 2B:
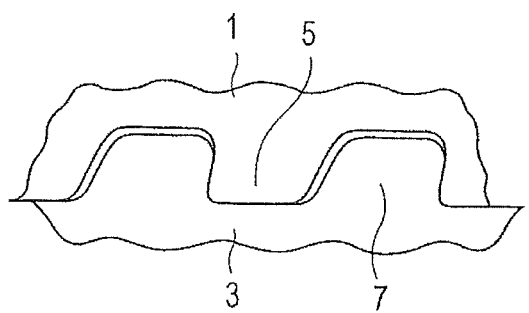
Figure 3A:
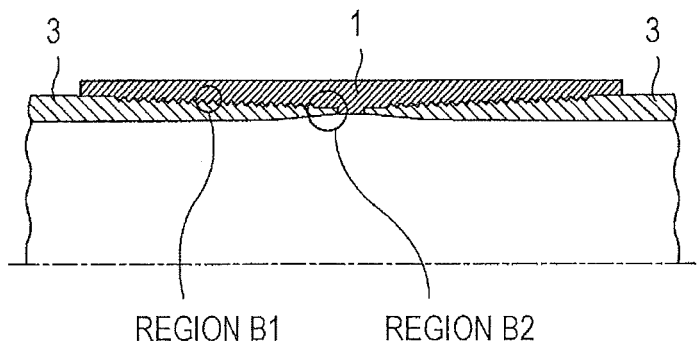
FIGS. 3(a)-3(c) include schematic longitudinal sectional views illustrating an exiting threaded joint for steel pipes.
Figure 3B:
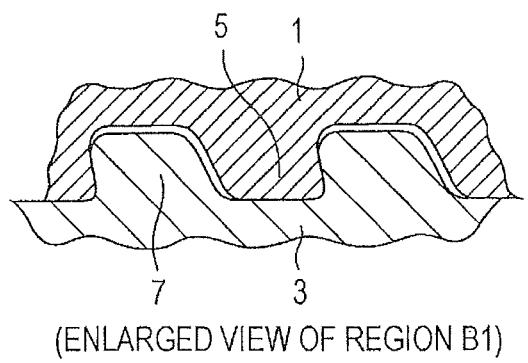
Figure 3C:
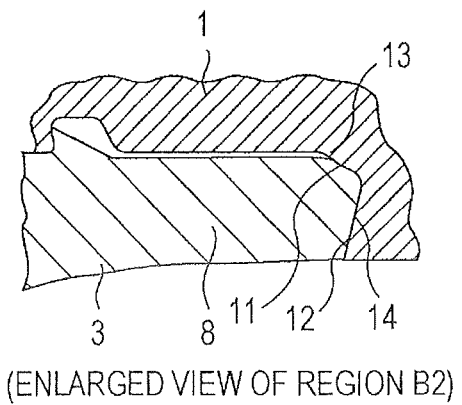

As illustrated in FIGS. 1, 2(a) and 2(b), the threaded joint for steel pipes includes a pin 3 and a box 1. The pin 3 includes an externally threaded male portion 7, a pin nose 8 extending from the externally threaded male portion 7 toward an end of pipe, and a shoulder portion 12 disposed at the end of the pin nose 8. The box 1 includes an internally threaded female portion 5 to be threadedly coupled with the externally threaded male portion 7, a seal face 21 facing an outer peripheral face of the pin nose 8 of the pin 3, and a shoulder portion 14 that contacts the shoulder portion 12 of the pin 3. The pin 3 and the box 1 are threadedly coupled to each other such that the outer peripheral face of the pin nose 8 and the seal face 21 of the box 1 come into metal-to-metal contact with each other, and the contact portion serves as a seal portion 20. That is, the threaded joint for steel pipes corresponds to the conventional radial-seal-type premium joint.

On the basis of the structure described above, as illustrated in FIG. 1, the outer peripheral face of the pin nose 8 (pin nose outer peripheral face 31) has a single tapered shape and the seal face 21 of the box 1 has an outwardly convex curved shape, and a seal point $x_p$ defined by equation (1) (also shown in FIG. 1) is greater than or equal to 0.2 inches (=0.2 inches×5.4 mm/inch =5.08 mm). FIG. 1 includes a schematic graph in which p is plotted against x.

If $x_p$ is greater than or equal to 0.2 inches, the diameter of the pin is prevented from being considerably reduced in an external pressure environment and high sealability can be maintained. There is a pin nose base gap 41, which is a gap extending from a boundary of the seal portion 20 near the threaded portion toward an end of the threaded portion. The pin nose base gap 41 connects to the outside of the threaded joint through a thread gap, which is a gap between the threaded portions that mesh with each other. Therefore, in an external pressure environment, an external pressure acts on the pin nose base gap 41 and applies a pressing force to the pin nose outer peripheral face 31. If $x_p$ is less than 0.2 inches, the pin 3 cannot withstand the pressing force, the outer diameter of the pin is considerably reduced, contact between the pin nose outer peripheral face 31 and the seal face 21 becomes loose, and sealability cannot be maintained.

On the other hand, even if $x_p$ is increased to a level greater than about 1.0 inch, sealability is not further improved, and it is more likely that productivity decreases because the length of the pin nose including the seal portion becomes too long. Therefore, it is preferable that $x_p$ be less than or equal to about 1.0 inch.

In calculating the seal point $x_p$, the upper and lower limits $x_1$ and $x_2$ of the interval of the integral are defined as the x coordinates of two intersecting points of the pin nose outer peripheral face 31 and the seal face 21 (the two intersecting points respectively corresponding to an end point of the seal portion 20 near the end of the pin and an end point of the seal portion 20 near the threaded portion) when cross-sectional views of the pin 3 and the box 1 having the same size are placed one on top of the other so that the pipe axes and shoulder faces of the pin 3 and the box 1 coincide with each other. Here, the x axis is parallel to the direction of the pipe axes and has an origin at the end of the pin nose. That is, x is the distance from the end of the pin nose in the pipe axis direction. The contact face pressure p is obtained as a function of x by performing an FEA calculation that simulates LP2 of the series A test of ISO 13679. In the FEA calculation, it is assumed that the element size is 0.001 (0.00254 cm) to 0.01 inches (0.0254 cm) and the box and the pin are elasto-plastic bodies.

EXAMPLE

Samples of threaded joints including pins having an outside diameter of 9+5/8 inches (24.45 cm) and a thickness of 0.545 inches (1.38 cm) made by machining ends of steel pipes, and boxes corresponding to the pins were prepared so that the pins have different tapered shapes and/or the boxes have seal faces have different outwardly curved shapes. For each of these samples, the contact face pressure p was obtained by performing an FEA calculation simulating LP2 of the series A test of ISO 13679, and the seal point $x_p$ was calculated from the contact face pressure p by using equation (1). Moreover, the series A test was performed on each of the samples. Table 1 shows the results.

As shown in Table 1, it is clear that the sealability of our examples is better than that of the comparative example.

TABLE 1

| | Seal Point $x_p$ (inches) | Result of A Test |
|---|---|---|
| Example 1 | 0.23 | No Leak |
| Example 2 | 0.31 | No Leak |
| Example 3 | 0.46 | No Leak |
| Example 4 | 0.62 | No Leak |
| Comparative Example | 0.15 | Leak occurred in LP12. |

The invention claimed is:

1. A threaded joint for steel pipes comprising:
a pin including an externally threaded male portion, a pin nose extending from the externally threaded male portion toward an end of pipe, and a shoulder portion disposed at the end of the pin nose, and
a box including an internally threaded female portion to be threadedly coupled with the externally threaded male portion, a seal face facing an outer peripheral face of the pin nose, and a shoulder portion that contacts the shoulder portion of the pin, wherein the pin and the box are threadedly coupled with each other such that the outer peripheral face of the pin nose and the seal face of the box come into metal-to-metal contact with each other, and the contact portion serves as a seal portion, the outer peripheral face of the pin nose has a single tapered shape, the seal face of the box has an outwardly convex curved shape, and a seal point $x_p$ defined by equation (1) is greater than or equal to 0.2 inches, $$x_p = \frac{\int_{x_1}^{x_2} pxdx}{F} \quad (1)$$

$$F = \int_{x_1}^{x_2} pdx$$

where p is a contact face pressure which is obtained as a function of x by performing an FEA calculation that simulates LP2 of the series A test of ISO 13679, x is a distance from an end of the pin in a pipe axis direction, and $x_1$ and $x_2$ are respectively a lower limit and an upper limit of a domain of x corresponding to the seal portion.

2. The threaded joint for tell pipes according to claim 1, wherein the seal point $x_p$ is 0.23 inches to 0.62 inches.

3. The threaded joint for steel pipes according to claim 1, wherein the seal point $x_p$ is 0.31 inches to 0.46 inches.

4. The threaded joint for steel pipes according to claim 1, wherein the threaded joint comprises a pin nose base gap, which is a gap extending from a boundary of the seal portion near the threaded portion toward an end of the threaded portion, wherein the threaded joint comprises a thread gap connecting the pin nose base gap to the outside of the threaded joint.

\* \* \* \* \*